(12) United States Patent
Miyata et al.

(10) Patent No.: US 8,155,911 B2
(45) Date of Patent: *Apr. 10, 2012

(54) FLOW RATE MEASUREMENT DEVICE

(75) Inventors: Hajime Miyata, Nara (JP); Yasuhiro Umekage, Shiga (JP); Kenichi Kamon, Nara (JP)

(73) Assignee: Panasonic Corporation, Osaka (JP)

( * ) Notice: Subject to any disclaimer, the term of this patent is extended or adjusted under 35 U.S.C. 154(b) by 274 days.

This patent is subject to a terminal disclaimer.

(21) Appl. No.: 12/477,377

(22) Filed: Jun. 3, 2009

(65) Prior Publication Data

US 2009/0240444 A1 Sep. 24, 2009

Related U.S. Application Data

(63) Continuation of application No. PCT/JP2007/074177, filed on Dec. 10, 2007.

(30) Foreign Application Priority Data

Dec. 11, 2006 (JP) .................................. 2006-332987

(51) Int. Cl.
*G01F 1/00* (2006.01)
(52) U.S. Cl. .............. 702/100; 702/12; 702/45; 702/50; 702/106; 702/179; 702/180; 702/181; 702/189; 73/861
(58) Field of Classification Search ..................... 702/12, 702/45, 50, 100, 106, 179–181, 189; 73/861
See application file for complete search history.

(56) References Cited

U.S. PATENT DOCUMENTS

| 6,076,542 | A | 6/2000 | Titus |
| 6,625,549 | B1 | 9/2003 | Nawa et al. |
| 7,809,514 | B2 * | 10/2010 | Miyata et al. .................. 702/45 |

FOREIGN PATENT DOCUMENTS

| EP | 1 881 304 | | 1/2008 |
| JP | 2002-71421 | | 3/2002 |
| JP | 2003-149027 | * | 5/2003 |

(Continued)

OTHER PUBLICATIONS

International Search Resort mailed Jun. 18, 2008 for PCT/JP2007/074177, 3 pages.

(Continued)

*Primary Examiner* — Sujoy Kundu
(74) *Attorney, Agent, or Firm* — Brinks Hoffer Gilson & Lione

(57) ABSTRACT

The present invention provides a flow rate measurement device for measuring a volume of gas flowing through a gas supply system in which a plurality of appliances are connected. The flow rate measurement device according to the second embodiment comprises a flow rate sensor configured to detect a gas flow flowing through the gas supply system and a differentiator configured to differentiate the detected gas flow. A memory is provided in which profiles of gas consumption by appliances are storable in relation to identities of the appliances. The flow rate measurement device according to the present invention also comprises a first profile finder which is responsive to the differentiated gas flow to search for a profile from the stored profiles which corresponds to the detected gas flow. The device further comprises a second profile finder which is responsive to a failure by the first profile finder to find the corresponding profile from the stored profiles to analyze the detected gas flow to thereby determine an identity of at least one of the plurality of appliances.

16 Claims, 10 Drawing Sheets

FOREIGN PATENT DOCUMENTS

| | | |
|---|---|---|
| JP | 2003-149075 | 5/2003 |
| JP | 2003-194331 | 7/2003 |
| JP | 2006-200801 | 8/2006 |
| JP | 2006-313114 | 11/2006 |

OTHER PUBLICATIONS

Written Opinion of the International Searching Authority mailed Jun. 18, 2008 for PCT/JP2007/074177, 7 pages.

* cited by examiner

FIG. 6

Table of data registered in memory(example)

| Appliance | Activation flow rate Qup(L/h) | Control | | Stop flow rate Qstop (L/h) |
| --- | --- | --- | --- | --- |
| | | Flow rate range Qcon(L/h) | Time Tcon(s) | |
| Fan heater | 120 | 10 ~ 30 | 4 or higher | 100 |
| Gas table | 90 | 30 ~ 80 | Less than 4 | 50 |

FLOW RATE MEASUREMENT DEVICE

RELATED APPLICATIONS

This application is a continuation of PCT/JP2007/074177 filed Dec. 10, 2007, which claims priority to JP2006-332987 filed Dec. 11, 2006, the entire content of which is incorporated herein by reference.

TECHNICAL FIELD

The present invention relates to a technique for identifying gas appliances being in use in order to provide new billing schemes and services based on the types of gas appliances and the ways they are used, and in accordance with a gas meter installed at the opening of a gas supply line entering a residential building for measuring the volume of gas consumption.

BACKGROUND ART

An example of the constitution of a prior art device for identifying gas appliances is given below.

Gas meters equipped with a gas flow meter at the opening of a gas supply line are typically installed in residential buildings.

Conventional gas meters achieve different billing schemes for respective appliances by obtaining a volumetric sum when gas flows during a specified time zone and a volumetric sum when gas flows within a specified flow volume range. That is, the flow volume for each time zone and the flow volume for each flow volume zone are determined, so as to establish a billing scheme using these volumetric sums. An example of such a prior art billing scheme is described with reference to FIG. 10. A predetermined discount flow rate zone and a predetermined discount time zone are set in advance, and a discount is applied to gas fees for flow volumes corresponding to this discount flow rate zone and this discount time zone. Thus, the shaded areas shown in FIG. 10 correspond to the zones subject to this discount (see, for example, Japanese Patent Application Kokai Publication No. 2002-71421).

However, this method falls short in identifying specific appliances, and thus does not readily provide a billing statement that is easy to understand and convenient for customers to identify charges billed for specific appliances.

Accordingly, the present Applicant has disclosed a method for identifying specific appliances, as described below (see, for example, Japanese Patent Application Kokai Publication No. 2006-313114).

The operation of the disclosed example is now described. Gas flow volume is measured with a gas meter at 2-second intervals, and this data is delivered to a differentiator to differentiate the flow volume value, which is then output as differentiated flow volume data for every 2 seconds.

This differentiated data is sequentially delivered to a profile finder and is then compared against comparative values stored in a memory. If the differentiated values exceed the comparative values, then a change is deemed to have occurred in the state of a gas appliance. Once a change is detected, then the identification means makes a comparison with the comparative profiles for each gas appliances stored in the memory, so as to identify the appliance and the state thereof.

Since activation identification of an appliance is performed by differentiating the flow volume values, it is relatively easy to perform activation identification of an appliance, even if another appliance is activated in a state in which another appliance is already operating.

In the above-described prior art configuration, if there is a failure in identifying an appliance for any reason, even if the appliance consumes some volume of gas, the gas consumption of the appliance cannot be recognized as a gas consumption and is treated as an error. Further, once a failure in identification occurs, it is difficult to correct, resulting in that there remains a lack of transparency in reliability in appliance identification.

The present invention eliminates the above-described drawback, and provides a gas appliance identification device with improved accuracy in identifying appliances, reducing errors in measuring appliance flow volume by performing identification again by a different means, if there was an error in identifying an appliance.

SUMMARY OF THE INVENTION

The first embodiment of the present invention provides a flow rate measurement device for measuring a volume of gas flowing through a gas supply system in which a plurality of appliances are connected. The flow rate measurement device according to the first embodiment comprises a flow rate sensor configured to detect a gas flow flowing through the gas supply system and a differentiator configured to differentiate the detected gas flow. The device also comprises a memory in which profiles of gas consumption by appliances are storable in relation to identities of the appliances.

The flow measurement device of the first embodiment further comprises a profile calculator which is responsive to the differentiated gas flow to calculate a profile from the stored profiles which corresponds to the detected gas flow to thereby determine identities of some of the plurality of appliances.

For each of the appliances, there may be stored in the memory at least one of a gas consumption profile exhibited in the beginning of the use thereof and a gas consumption profile exhibited in the end of the use thereof.

The profile calculator may be responsive to the differentiated gas flow to search for a sum of profiles selected from the stored profiles which corresponds to the detected gas flow.

The present invention also provides a flow rate measurement device of the second embodiment for measuring a volume of gas flowing through a gas supply system in which a plurality of appliances are connected. The flow rate measurement device according to the second embodiment comprises a flow rate sensor configured to detect a gas flow flowing through the gas supply system and a differentiator configured to differentiate the detected gas flow. A memory is provided in which profiles of gas consumption by appliances are storable in relation to identities of the appliances.

The flow rate measurement device according to the second embodiment also comprises a first profile finder which is responsive to the differentiated gas flow to search for a profile from the stored profiles which corresponds to the detected gas flow. The device further comprises a second profile finder which is responsive to a failure by the first profile finder to find the corresponding profile from the stored profiles to analyze the detected gas flow to thereby determine an identity of at least one of the plurality of appliances.

In the second embodiment, for each of the appliances, there may be stored in the memory at least one of a gas consumption profile exhibited in the beginning of the use thereof, a gas consumption profile exhibited in the end of the use thereof and a gas consumption profile exhibited in association with a control of gas burning thereby.

The second profile finder may analyze the detected gas flow by searching, in response to the differentiated gas flow, for a sum of profiles selected from the stored profiles which corresponds to the detected gas flow.

The differentiated gas flow may have a positive value or a negative value.

The second profile finder may analyze the detected gas flow by searching, in response to the differentiated gas flow, for a profile from the stored profiles which corresponds to a decrease of the detected gas flow.

The second profile finder may analyze the detected gas flow by searching for a profile from the stored profiles which corresponds to a profile exhibited in association with a control of gas burning.

The present invention further provides flow rate measurement methods for measuring a volume of gas flowing through a gas supply system in which a plurality of appliances are connected. These methods are implemented in the above flow rate measurement devices.

The present invention makes it possible to accurately identify gas appliances which are used, even if a plurality of gas appliances are activated simultaneously, and also makes it possible to raise the precision of safety functions and various services such as new billing menus based on appliance profile data, thereby greatly contributing to an increased demand for gas, since it executes appliance profile re-calculation using a different identification logic from that of ordinary gas appliance identification even in cases where it was not possible to identify the gas appliances used by means of ordinary appliance identification performed by identifying the used gas appliances in comparison with activation identification values stored in a memory.

The flow rate measurement device of the present invention makes it possible to accurately identify gas appliances which are used, even if a plurality of gas appliances are activated simultaneously, since it executes appliance profile re-calculation using a different identification logic from that of ordinary gas identification even in cases where it was not possible to identify the gas appliances used by means of ordinary appliance identification, thereby making it possible to raise the precision of safety functions and various services such as new billing menus based on appliance profile data, thus greatly contributing to an increased demand for gas.

BRIEF DESCRIPTION OF THE DRAWINGS

FIG. 6 is a table illustrating an example of registered data values in a flow rate measurement device of the present invention.

DETAILED DESCRIPTION OF THE PREFERRED EMBODIMENTS

Figure 1:
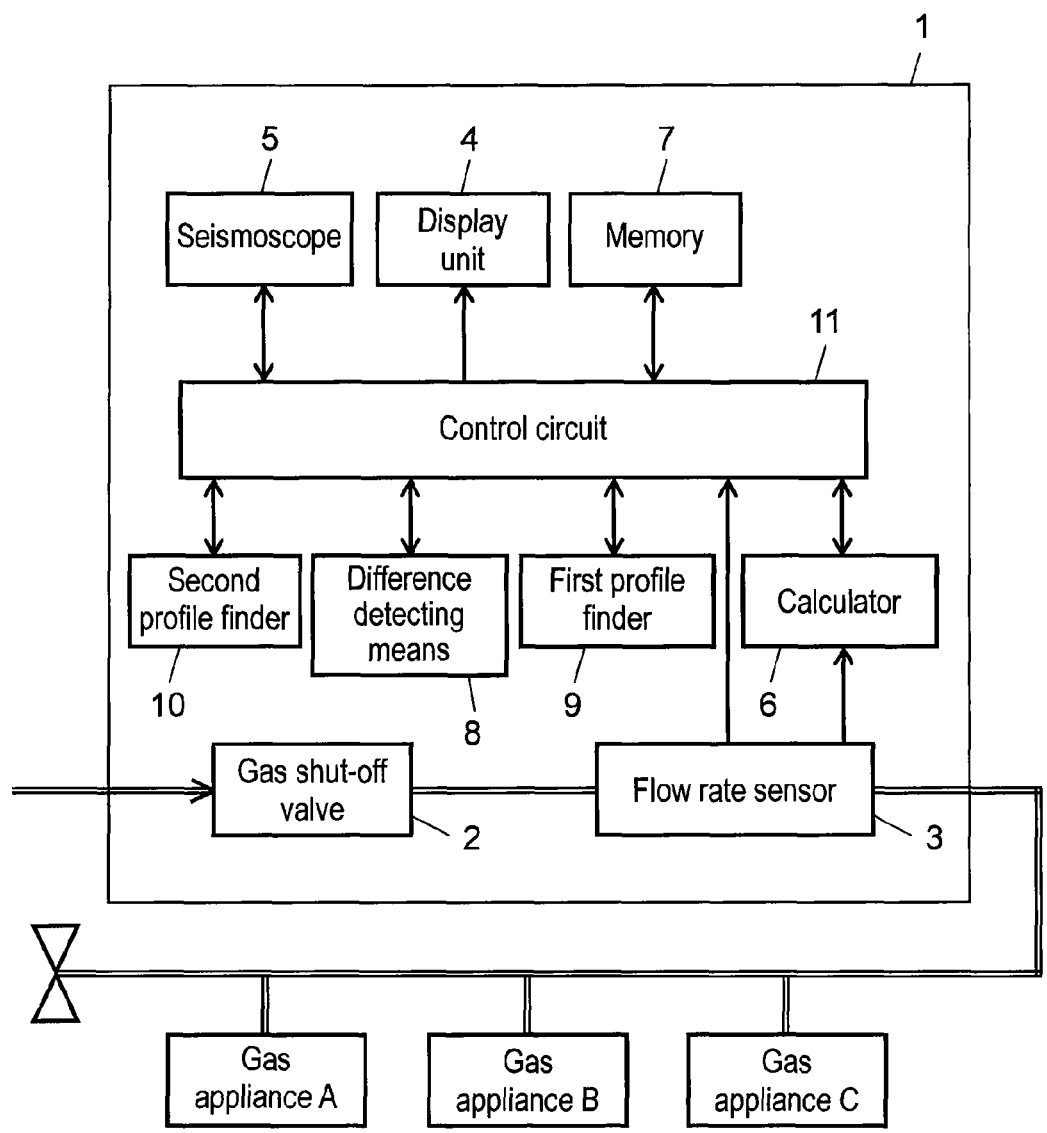
FIG. 1 is a schematic diagram illustrating the structure of a flow rate measurement device in an embodiment of the present invention.

FIG. 1 shows the structure of a flow rate measurement device in an embodiment of the present invention.

In FIG. 1, Reference Numeral 1 is a flow rate measurement device, installed in a gas supply line, with one or more gas appliances installed for various household needs connected to a pipe on the downstream side.

Within the flow rate measurement device 1 are provided a gas shut-off valve 2 and a gas flow rate sensor 3 located within a gas flow channel and connected to the gas supply line, and gas flow rate signals detected by the flow rate sensor 3 are processed so as to determine a flow volume of gas used. This flow volume of gas used can indicate the monthly usage or total cumulative usage via a display unit 4 using any desired format.

In addition, a seismoscope 5 is installed for detecting vibrations such as earthquakes, and when vibrations exceeding a predetermined level are detected, the gas shut-off valve 2 is activated so as to shut off the gas flow channel.

Moreover, using the flow volume signals detected by the flow rate sensor 3, a calculator 6, a memory 7, a difference detecting means 8, a first profile finder 9, and a second profile finder 10 are provided as gas appliance identification means for determining which gas appliance is used among the gas appliances connected to a gas flow channel. By controlling these means which are organically associated, the gas appliance identification function is effectively implemented. Also, a control circuit 11 is provided to execute abnormal processing. Batteries (not shown) are installed as a power source.

In the memory 7 are stored activation identification values which are the basis for determining whether or not changes have occurred in flow volume, as well as profiles at points of change in a series of combustion states of the various gas appliances (activation time, control time, stopping time, etc.). The profiles include values representative of gas consumption characteristics exhibited by various gas appliances. One example of profile shows absolute values representative of gas consumption exhibited by a gas appliance over time. Another example of profile shows the absolute values differentiated by time. Another example of profile shows a configuration of a graph drawn with the absolute values or differentiated values on the gas flow rate and time domain. Another example of profile shows cycles of gas consumption. Another example of profile shows an overshoot of gas flow rate exhibited when a gas appliance is turned on. Another example of profile shows an inclination of gas consumption graph. Another example of profile shows a signature of gas consumption peculiar to a gas appliance which is exhibited when the gas appliance is subjected to a gas consumption control peculiar to the gas appliance. In this embodiment, semiconductor memory is used as memory for retaining stored data, but if additional recording and write-over are allowed, then electromagnetic recording media are also possible.

It should be noted that, with regard to the flow rate sensor 3 in this embodiment, although an ultrasonic measurement device is used, it is also possible to use other flow rate measurement devices such as the fluidic type capable of making continuous measurements at constant cycles for short time periods can also be used.

Following is a description of the operation of the flow rate measurement device of this embodiment.

Figure 2:
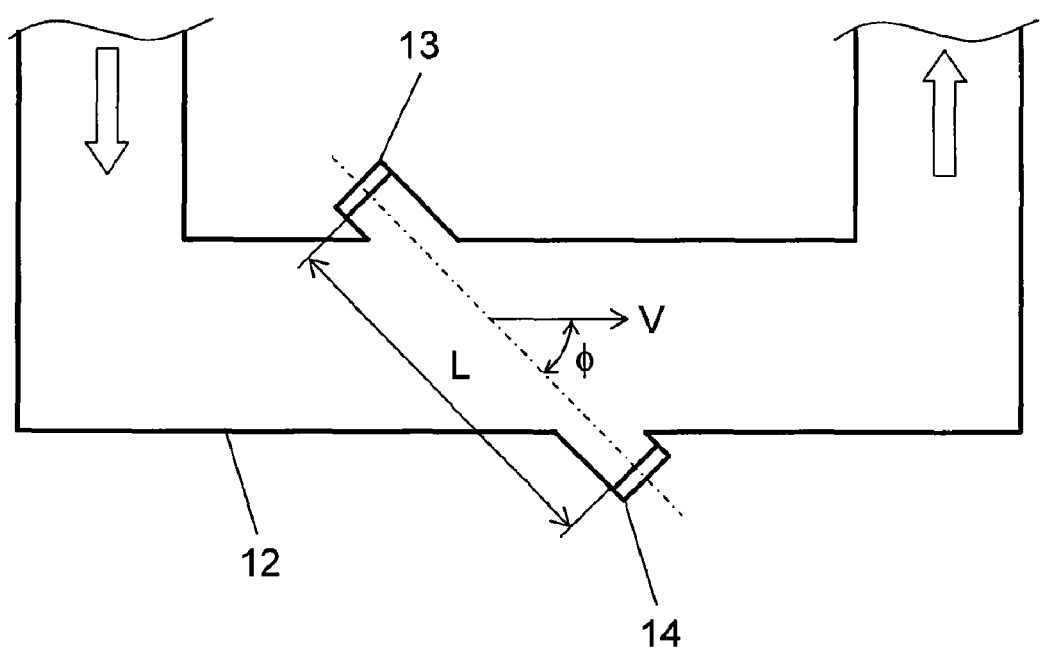
FIG. 2 is a diagram illustrating a flow rate sensor unit in a flow rate measurement device of the present invention.

First, FIG. 2 is used to illustrate ultrasonic flow velocity measurement of the flow rate sensor 3. A measurement flow channel 12 installed in the gas flow channel has a rectangular cross section. A pair of ultrasound transmitters and receivers 13 and 14 is disposed between walls perpendicular with respect to the flow of gas in the measurement flow channel 12. The pair 13 and 14 is installed at an incline having an angle φ on the upstream side and the downstream side of the flow channel. A measurement control means (not pictured) of the flow rate sensor 3 allows an alternating transmission and receipt of ultrasound waves between the transmitters and receivers 13 and 14 so that the difference between propagation times of ultrasound waves is measured at constant intervals in the forward direction and in the reverse direction with respect to the flow of a fluid, and outputs this measurement as a propagation time difference signal. A computing means (not pictured) of the flow rate sensor 3 receives this propagation time difference signal and computes the flow velocity and the flow volume of the fluid to be measured.

The computation method is described below.

In FIG. 2, L is the measurement length, t1 is the transmission time from upstream, t2 is the transmission time from downstream, C is the speed of sound, and the flow velocity V is obtained using the following formula.

$$V = (L/2 \cos \phi) \times ((1/t1) - (1/t2))$$ Formula (1)

The measurement time interval can be set within a range wherein the transmission and receipt of ultrasound waves is possible, but in this embodiment, measurements are taken at intervals of 2 seconds. From the standpoint of measurement principles, the time interval can be shortened further. Since there are gas appliances that are activated at time intervals shorter than 2 seconds, reducing the measurement time interval is advantageous for instantaneous appliance identification. However, there is the drawback that battery wear increases when the measurement time interval is shortened.

If the measurement time is such that measurement interval is in seconds on a 2-digit order, as in the membrane systems used in conventional gas meters, it becomes difficult to make a judgment on the basis of a difference in flow volume change using the algorithm of the present invention. Thus, in this embodiment, measurements are performed at 2-second time intervals, considered to be a well-balanced time interval from the standpoint of appliance identification cost and performance.

Figure 3:
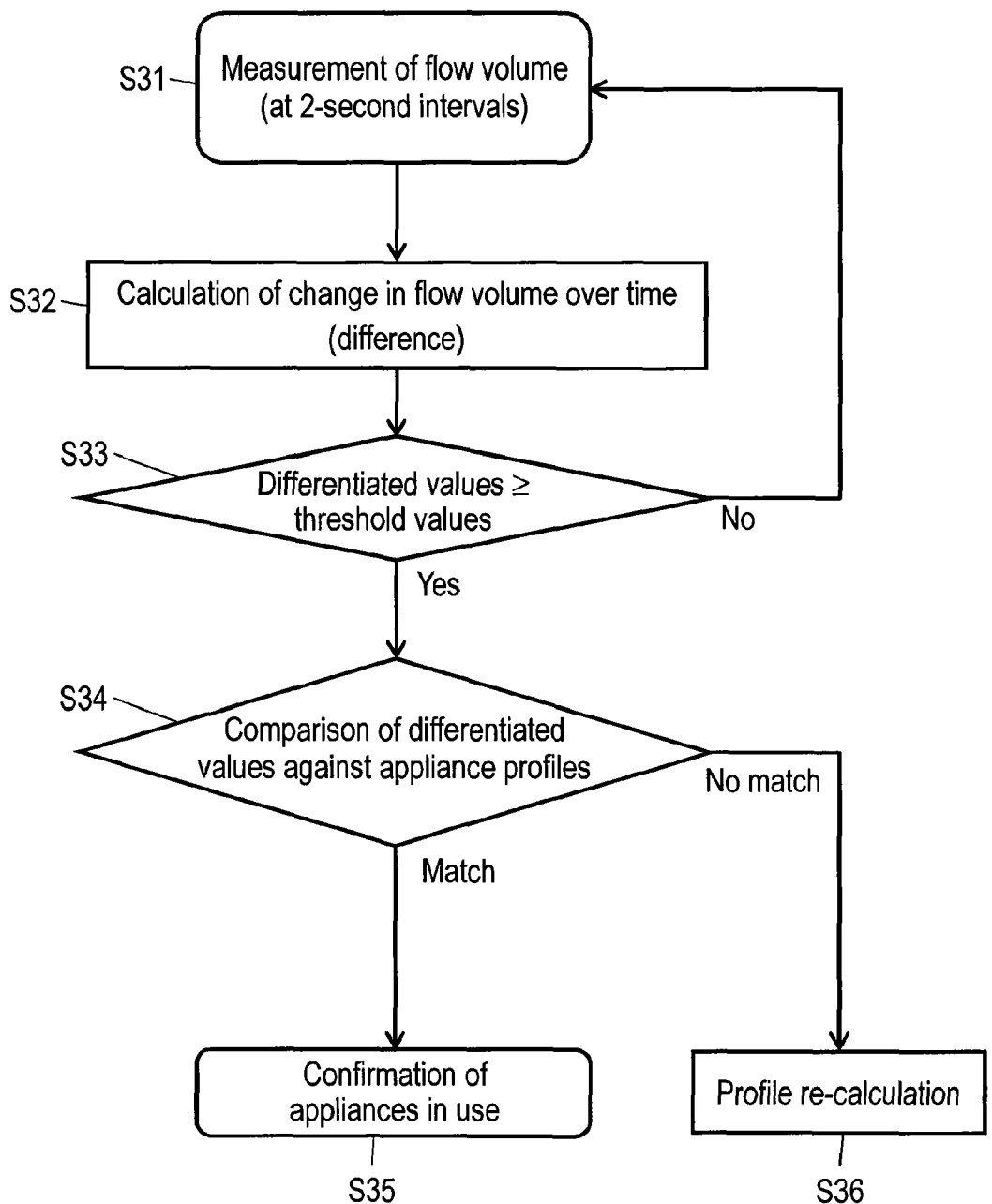
FIG. 3 is a flow chart of the identification operation in a flow rate measurement device of the present invention.

Next, FIG. 3 illustrates the identification logic for gas appliances which are being operated.

In the flow rate measurement device of this embodiment, the gas flow volume is measured at 2-second intervals as described above (S31), and this data is transmitted to the calculator 6 which differentiates the flow volume value, outputting it as differentiated data for flow volume every 2 seconds (S32). This differentiated data is delivered to the difference detecting means 8, and then compared against threshold values stored in the memory 7 (S33). Given these comparison results, if the differentiated values exceed the threshold vales, a judgment is made that some of the gas appliances are activated. Next, once a judgment is made that gas appliances are activated, then the first profile finder 9 compares the flow volume value with the gas consumption profile values of the various gas appliances stored in the memory 7 (S34), in order to determine which gas appliance has been activated, and the activated appliance is identified (S35).

Figure 4:
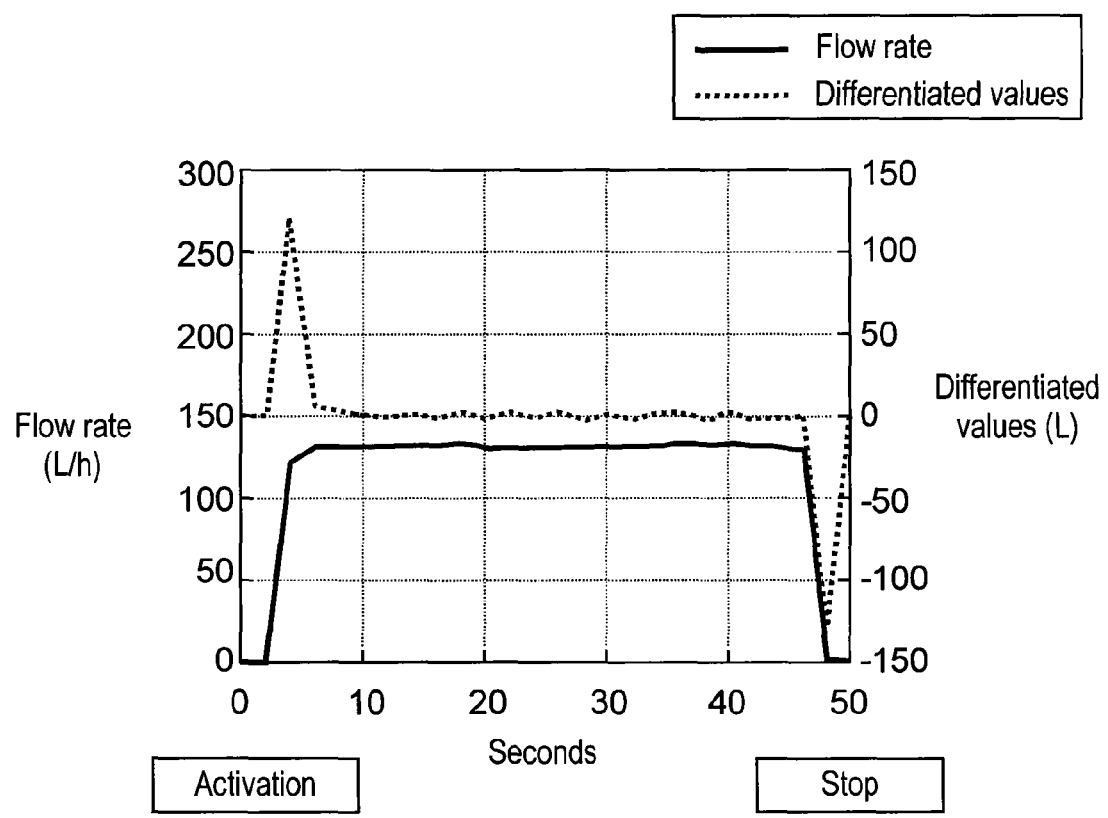
FIG. 4 is a graph illustrating the relationship between changes in flow volume and changes in differentiated values in a flow rate measurement device of the present invention.

FIG. 4 illustrates specific changes in flow volume and changes in differentiated values when a gas appliance is in use.

In FIG. 4, the solid line represents the gas flow volume values measured by the flow rate sensor 3, and the dashed line represents the differentiated values at that time, that is the differentiated values every 2 seconds. The differentiated values at the time of gas appliance activation are expressed by a peak on the plus side, and the differentiated values at the end of gas appliance use are expressed by a peak on the minus side.

It should be noted that in the above embodiment, when changes in differentiated values first reach a specified value (change profile) or higher, a determination is made that an appliance becomes in use, and a process moves to the next step in which a determination is made as to the identification of the appliance which has become in use. However, in cases where identification of an appliance is made among the limited number of previously registered appliances, or if the processing speed is fast, and the differentiated data directly from the calculator 6 can be compared within 2 seconds against profile data at points of change for all of the various gas appliances, then it is possible to identify the gas appliances directly from the differentiated values.

Figure 5:
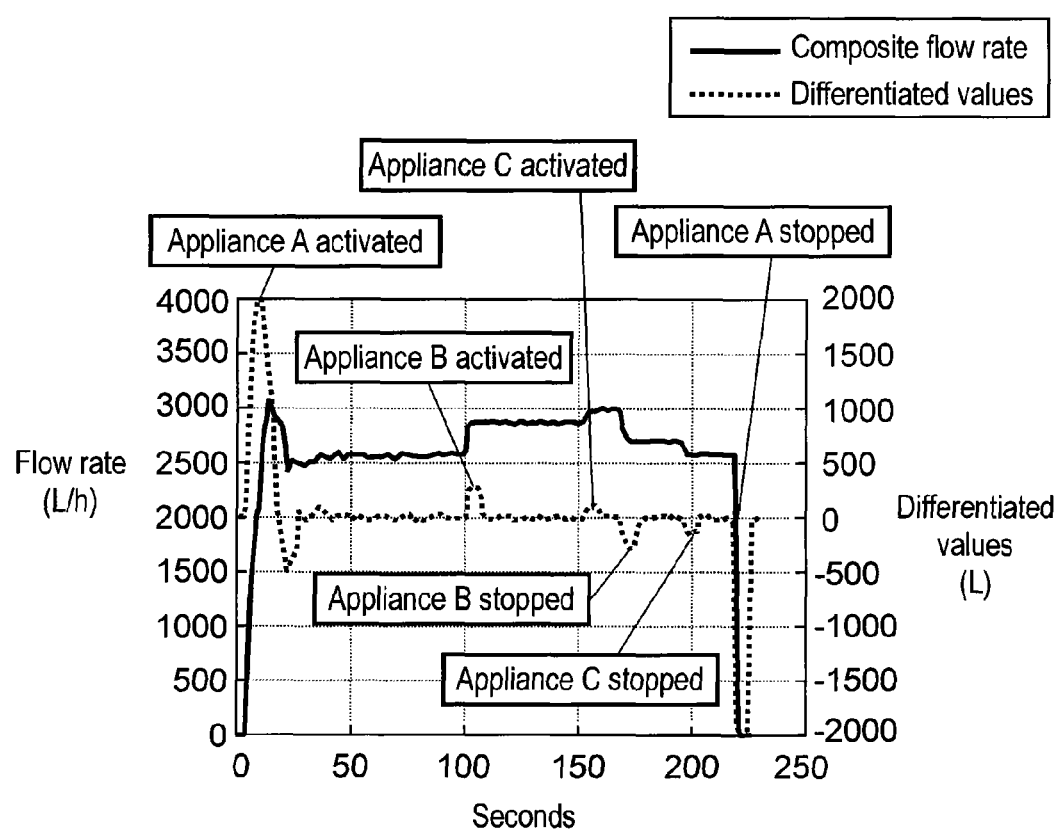
FIG. 5 is a graph illustrating another relationship between changes in flow volume and changes in differentiated values in a flow rate measurement device of the present invention.

FIG. 5 is a graph showing flow volume values and differentiated values when 3 appliances (A, B, and C) are used simultaneously, and makes it possible to confirm readings for changes of activation time and stopping time of the 3 appliances.

A configuration can be used for confirming profile information, either by displaying data resulting from the identification of appliances on the display unit 4 via the control circuit 11, or by forwarding said data to an external terminal (not pictured) for display. Transmission of data to said external terminal can be accomplished using a wired or wireless arrangement.

It should be noted that it is possible to conceive of cases in which a matching profile cannot be found in the memory, for instance, when 2 appliances are activated simultaneously, or a low-flow volume appliance is activated while a high-flow volume appliance such as a hot water-supply appliance is in operation. If a matching profile is not found in the memory the appliance cannot be identified.

In this embodiment, in cases where appliances are not recognized even though changes in flow volume occurred, appliances are identified using a separate logic of the second profile finder 10 (S36 in FIG. 3), which differs from the ordinary activation identification logic described above and shown in FIG. 3.

Following is an explanation of the identification logic of the second profile finder 10.

The first profile finder 10 executes appliance identification processing, using the gas consumption profile date stored in the memory 7. However, since the profiles of the gas appliances are stored separately in the memory 7, in the case where a plurality of gas appliances, e.g., when 2 gas appliances are activated simultaneously, a comparison between flow volume change values of the 2 appliances and the profiles stored in the memory 7 will not yield an identification of any appliance.

Accordingly, the first identification logic in this embodiment identifies activated appliances by searching for the matching of the magnitude of flow volume change computed by the difference detecting means 8 and the addition values of some of the activation flow rates for the appliances.

It should be noted that in this embodiment, registered data for each used appliance is provided, as shown in FIG. 6.

Figure 7:
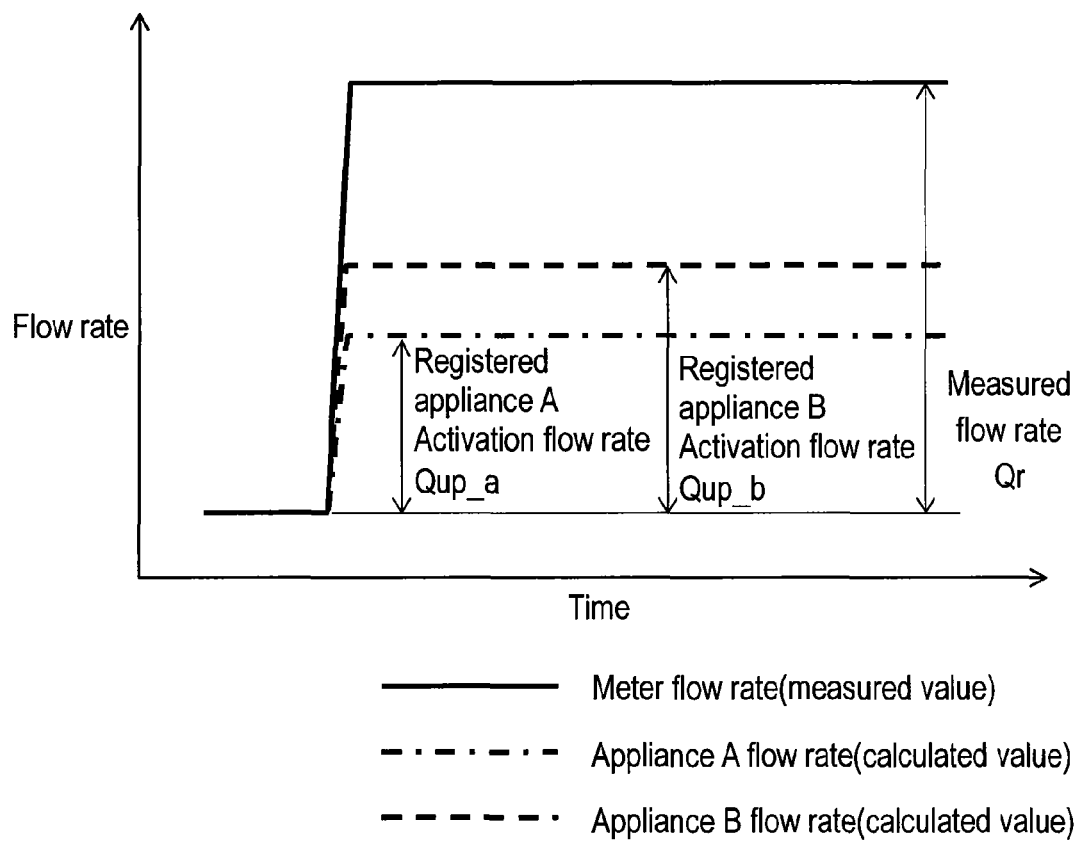
FIG. 7 is a diagram illustrating functions in a flow rate measurement device of the present invention.

For example, as shown in FIG. 7, the measured flow rate from the flow rate sensor 3 is Qr, and in cases where no appliance is registered that matches Qr at this time, and if the registered activation flow rate for the registered appliances A and B are Qup_a and Qup_b, and if Qup_a+Qup_b≈Qr, then the activated appliances are deemed to be appliance A and appliance B.

Thus, the above first identification logic is used in cases where it is impossible to identify the appliances used by means of ordinary appliance identification processing in which a change in flow rate is detected, and the change in rate Qr is compared separately against the activation identification values Qup_a and Qup_b stored in the memory 7. In the first identification logic, an addition of activation identification values stored in the memory 7 (Qup_a+Qup_b) is performed and compared against the value Qr, thereby making accurate identification of appliances in use, even in cases where a plurality of gas appliances are activated simultaneously, and making it possible to raise the precision of safety functions and various services such as new billing menus based on appliance profile data, thereby greatly contributing to an increased demand for gas.

In this embodiment there is described a case where 2 gas appliances are activated simultaneously, but it goes without saying that identification is likewise possible in cases where more than 2 gas appliances are activated simultaneously.

Following is an explanation of the second identification logic of the second profile finder 10. In cases where identification of activated gas appliances is impossible, such as when there is a plurality of gas appliances as above, e.g., when 2 gas appliances are activated simultaneously, the second profile finder 10 waits for the difference detecting means 8 to detect changes in appliance flow rates. When the difference detecting means 8 detects a change in flow rate, whose differentiated value is on the minus side, it is determined that one of the gas appliances has stopped. A comparison is then made against the stop identification values stored in the memory 7 to identify which appliance was in use. In addition, an identification is made regarding the gas appliance currently in use on the basis of flow rate measurements made by the flow rate sensor 3. Thereby, the gas appliances are accurately identified, even under conditions in which an ordinary first profile finder 9 cannot make an identification, such as in the case where a plurality of gas appliances are activated simultaneously.

Figure 8:
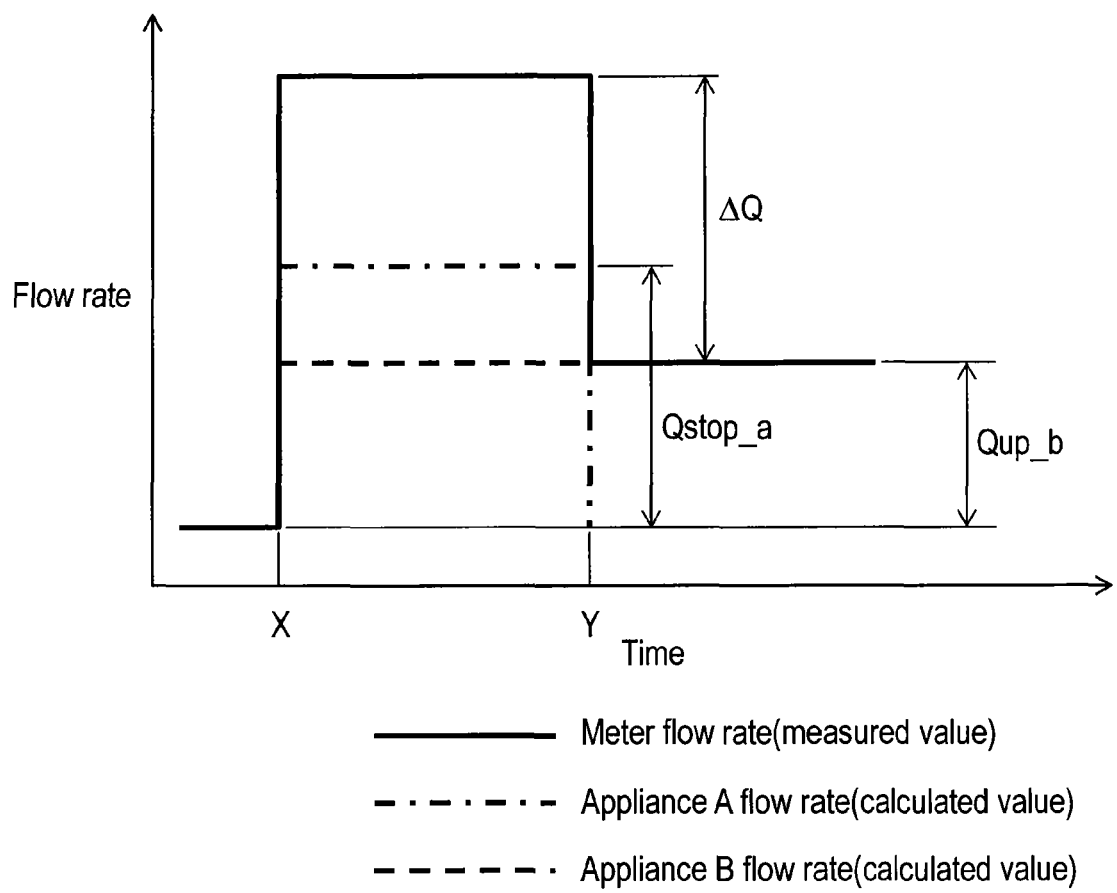
FIG. 8 is a diagram illustrating other functions in a flow rate measurement device of the present invention.

That is to say, as shown in FIG. 8, assuming that appliance A and appliance B are activated simultaneously, and assuming that appliance A stops first, the change in flow rate measured at this point in time Y is ΔQ. Since the stop flow rate Qstop_a registered for appliance A is almost equal to ΔQ, the second profile finder 10 determines that appliance A has stopped, and thereby further determines that appliance A is activated at the point in time X and stops at the point in time Y. Activation of the other appliance was deemed to be that of appliance B, since the usage flow rate after the point in time Y and the registered activation flow rate of appliance B are almost equal.

The present invention provides another embodiment for use in cases where an ordinary first profile finder 9 cannot make an identification, in such cases where 2 or more gas appliances are activated and the differentiated values and the profiles were not found to match by the first profile finder 9. In such cases, suppose that the difference detecting means 8 detects a change whose differentiated value is on the minus side. If a comparison between the flow change rate and the stop identification values in the memory 7 yields no identification of appliance, it is determined that a plurality of gas appliances have stopped simultaneously. A comparison is further made against addition values of stop identification values stored in the memory 7. If addition values of stop identification values are found which are in the vicinity of the flow rate difference, the appliances which have stopped simultaneously can be identified. Thus, the embodiment makes an identification of appliances possible even when the fist profile finder 9 cannot identify the applications.

Following is an explanation of the third identification logic of the second profile finder 10. Suppose likewise that it is impossible to identify an activated gas appliance, such as when an appliance is activated at the same time as the two appliances as above. If the appliance has a flow volume control function, the gas appliance in use exhibits a flow volume wave pattern unique to that appliance. Thus, by storing in the memory 7 the flow volume control characteristics, an identification becomes possible based on an instantaneous flow volume measured by the flow sensor 3.

Figure 9:
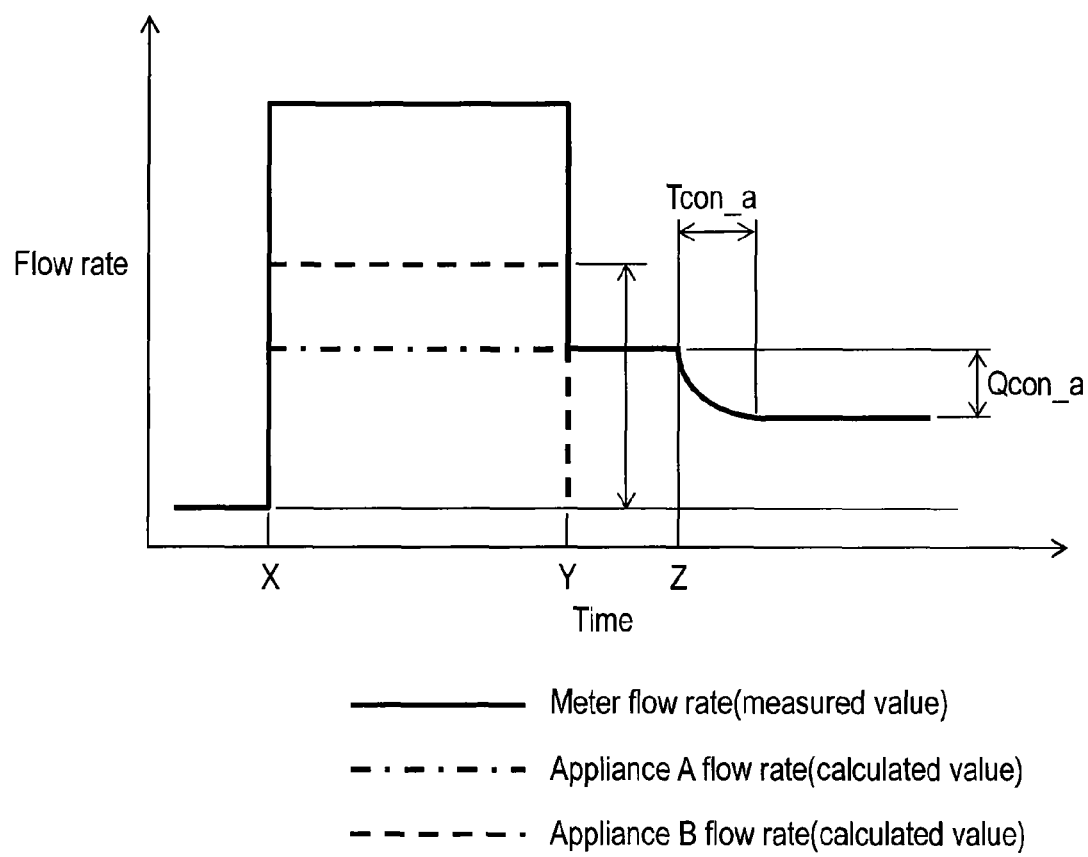
FIG. 9 is a diagram illustrating other functions in a flow rate measurement device of the present invention.
Figure 10:
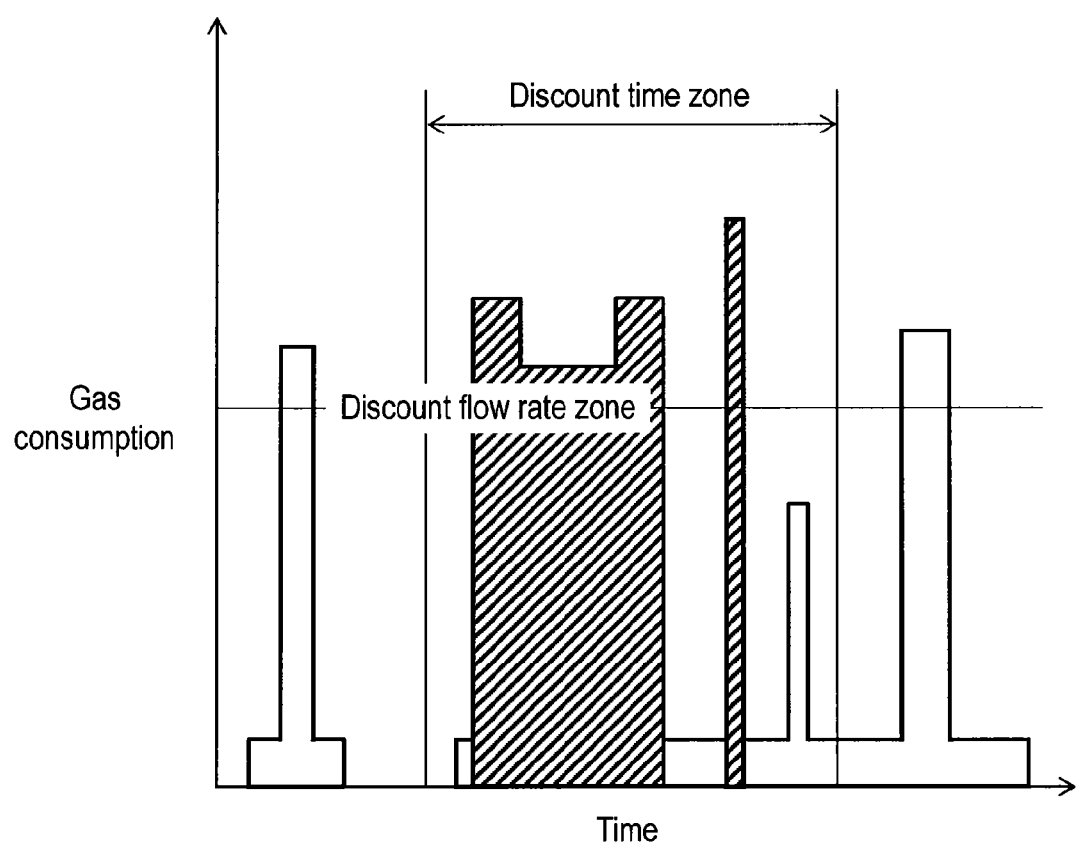
FIG. 10 is a conceptual diagram illustrating the identification method of a prior art flow rate measurement device.

In other words, as shown in FIG. 9, appliance A and appliance B were activated simultaneously, and thus the first profile finder failed to identify these two appliances. If a flow rate change occurring at point in time Z (the changed time is Tcon_a and the changed flow rate is Qcon_a) is registered as a controlled flow rate change of appliance A, then it is possible to confirm that appliance A is running at that point in time, thereby making it possible to determine that appliance A was activated at point in time X.

It should be noted that due to the fact that the configuration of the flow rate measurement device 1 includes an appliance-specific flow rate integrator (not pictured) makes it possible to determine changes in gas consumption per appliance and per function by integrating the change values for the various gas volumes.

It is also possible to calculate any fee according to the appliance or the function established by a gas company, due to the fact that a fee calculator (not pictured) is provided for separate gas flow volumes so that separate fees can be charged for gas consumption of separate appliances and functions.

As an example of a new billing scheme that can be offered, it is conceivable that a discount system be applied to heating appliances only, so that the consumer feels that he is getting a discount on gas charges, leading to expanded demand for gas from a gas company, and increased sales in appliances, due to the extended use of heaters.

In the flow rate measurement device of this embodiment as described above, it is possible to accurately identify the gas appliances which are used, even in cases where a plurality of gas appliances are simultaneously activated, and in cases it is impossible to identify the gas appliances which are used, with ordinary appliance identification processing which identifies the gas appliances which are used by making a comparison against activation identification values stored in the memory 7. The appliance re-identification processing is performed using identification logics that differ from that of the ordinary appliance identification processing, thereby making it possible to raise the precision of safety functions and various services such as new billing menus based on appliance profile data, thus greatly contributing to an increased demand for gas.

Since the appliance re-identification processing of the present invention provides a plurality of appliance identification logics, when flow volume changes are detected, and the changed volumes do not match the predetermined profiles, it is possible to accurately identify the gas appliances which are used.

Even under conditions in which an ordinary first profile finder 9 fails to make an identification, such as in the case where a plurality of gas appliances are used simultaneously, it is also possible to accurately identify the gas appliances which are used, since a variety of values stored in the memory 7 are used, and since the second profile finder 10 is provided to execute re-identification processing using special identification logics such as addition or subtraction processing, in cases where the first profile finder 9 is unable to identify the gas appliances which are used.

Even under conditions in which an ordinary first profile finder 9 fails to make an identification, it is also possible to accurately identify the gas appliances which are used, by performing addition processing of activation profiles stored in the memory 7, in cases where the first profile finder 9 is unable to identify the gas appliances which are used.

Even under conditions in which an ordinary profile finder fails to make an identification, such as when a plurality of gas appliances are activated simultaneously, it is also possible to accurately identify the gas appliances which are used. If the first profile finder 9 is unable to identify the gas appliances which are used, the appliance re-identification processing of the present invention waits until the difference detecting means 8 detects a flow rate change whose differentiated value is on the minus side. A determination is then made as to which gas appliances stopped by comparing against the stop profiles stored in the memory 7.

Even under conditions in which an ordinary profile finder cannot perform identification, such as when a plurality of gas appliances are activated simultaneously, it is also possible to accurately identify the gas appliances which are used. In cases where a plurality of gas appliances stopped simultaneously, the appliance re-identification processing of the present invention performs addition of stop profiles and finds addition values of stop identification values in the vicinity of the flow rate difference.

In appliances which have a flow volume control function, appliance identification can be performed with even greater precision by storing flow volume control characteristics in the memory 7.

This invention makes it possible to utilize new billing menus or the like prepared by a gas company, and to greatly contribute to an increased demand for gas, by building a gas supply system utilizing the flow rate measurement device 1 connected to a residential gas supply line.

As described above, the flow rate measurement device of the present invention is able to increase the accuracy of appliance identification by using a separate identification method, even if there are changes in flow volume leading to errors in appliance identification. The present invention possesses a second profile finder which performs appliance identification using logics different from that of the ordinary profile finder. Therefore, an identification of appliance becomes possible in cases where the appliances being used cannot be identified using the ordinary appliance identification logic, thereby making it possible to effectively utilize various services such as new billing menus offered by a gas company.

What is claimed is:

1. A flow rate measurement device for measuring a volume of gas flowing through a gas supply system in which a plurality of appliances are connected, comprising:
    a flow rate sensor configured to detect a gas flow flowing through the gas supply system;
    a differentiator configured to differentiate the detected gas flow;
    a memory in which profiles of gas consumption by appliances are storable in relation to identities of the appliances; and
    a profile calculator responsive to the differentiated gas flow to calculate a profile, using one or more of the stored profiles, which matches the detected gas flow to thereby determine identities of some of the plurality of appliances.

2. The flow rate measurement device according to claim 1, wherein for each of the appliances, there is stored in the memory at least one of a gas consumption profile exhibited in a beginning of use thereof and a gas consumption profile exhibited in an end of use thereof.

3. The flow rate measurement device according to claim 1, wherein the profile calculator is responsive to the differentiated gas flow to calculate a sum of profiles selected from the stored profiles which matches the detected gas flow.

4. A flow rate measurement device for measuring a volume of gas flowing through a gas supply system in which a plurality of appliances are connected, comprising:
    a flow rate sensor configured to detect a gas flow flowing through the gas supply system;
    a differentiator configured to differentiate the detected gas flow;
    a memory in which profiles of gas consumption by appliances are storable in relation to identities of the appliances;
    a first profile finder responsive to the differentiated gas flow to search for a profile from the stored profiles which corresponds to the detected gas flow; and
    a second profile finder responsive to a failure by the first profile finder to find the corresponding profile from the stored profiles to further analyze the detected gas flow to thereby determine an identity of at least one of the plurality of appliances, wherein the second profile finder implements at least one of:
    calculating a sum of profiles selected from the stored profiles which matches the detected gas flow; and
    searching for a profile from the stored profiles which corresponds to a decrease of the detected gas flow.

5. The flow rate measurement device according to claim 4, wherein for each of the appliances, there is stored in the memory at least one of a gas consumption profile exhibited in a beginning of use thereof, a gas consumption profile exhibited in an end of use thereof and a gas consumption profile exhibited in association with a control of gas burning thereby.

6. The flow rate measurement device according to claim 4, wherein the differentiated gas flow has a positive value.

7. The flow rate measurement device according to claim 4, wherein the differentiated gas flow has a negative value.

8. The flow rate measurement device according to claim 4, wherein the second profile finder further analyzes the detected gas flow by searching for a profile from the stored profiles which corresponds to a profile exhibited in association with a control of gas burning.

9. A flow rate measurement method for measuring a volume of gas flowing through a gas supply system in which a plurality of appliances are connected, the method comprising computer executable steps executed by a control circuit of a flow rate measurement device to implement:
    detecting a gas flow flowing through the gas supply system;
    differentiating the detected gas flow;
    providing a memory in which profiles of gas consumption by appliances are storable in relation to identities of the appliances; and
    responsive to the differentiated gas flow, calculating a profile, using one or more of the stored profiles, which matches the detected gas flow to thereby determine identities of some of the plurality of appliances.

10. The method according to claim 9, wherein for each of the appliances, there is stored in the memory at least one of a gas consumption profile exhibited in a beginning of use thereof and a gas consumption profile exhibited in an end of use thereof.

11. The method according to claim 9, wherein calculating a profile from the stored profiles comprises calculating a sum of profiles selected from the stored profiles which matches the detected gas flow.

12. The flow rate measurement method for measuring a volume of gas flowing through a gas supply system in which a plurality of appliances are connected, the method comprising computer executable steps executed by a control circuit of a flow rate measurement device to implement:
- detecting a gas flow flowing through the gas supply system;
- differentiating the detected gas flow;
- providing a memory in which profiles of gas consumption by appliances are storable in relation to identities of the appliances;
- responsive to the differentiated gas flow, searching for a profile from the stored profiles which corresponds to the detected gas flow; and
- responsive to a failure to find the corresponding profile from the stored profiles, further analyzing the detected gas flow to thereby determine an identity of at least one of the plurality of appliances, wherein further analyzing the detected gas flow comprises at least one of:
  - calculating a sum of profiles selected from the stored profiles which matches the detected gas flow; and
  - searching for a profile from the stored profiles which corresponds to a decrease of the detected gas flow.

13. The method according to claim 12, wherein for each of the appliances, at least one of a gas consumption profile exhibited in a beginning of use thereof, a gas consumption profile exhibited in an end of use thereof and a gas consumption profile exhibited in association with a control of gas burning thereby.

14. The method according to claim 12, wherein searching comprises searching in response the differentiated gas flow having a positive value.

15. The method according to claim 12, wherein searching comprises searching in response the differentiated gas flow having a negative value.

16. The method according to claim 12, wherein further analyzing the detected gas flow comprising searching for a profile from the stored profiles which corresponds to a profile exhibited in association with a control of gas burning.

* * * * *

UNITED STATES PATENT AND TRADEMARK OFFICE
CERTIFICATE OF CORRECTION

PATENT NO.        : 8,155,911 B2                                      Page 1 of 1
APPLICATION NO.   : 12/477377
DATED             : April 10, 2012
INVENTOR(S)       : Hajime Miyata et al.

It is certified that error appears in the above-identified patent and that said Letters Patent is hereby corrected as shown below:

In the Claims

In column 12, claim 14, line 14, after "searching in response" insert --to--.

In column 12, claim 15, line 17, after "searching in response" insert --to--.

Signed and Sealed this
Thirty-first Day of July, 2012

David J. Kappos
*Director of the United States Patent and Trademark Office*